United States Patent
Hunter

(10) Patent No.: US 8,235,009 B2
(45) Date of Patent: *Aug. 7, 2012

(54) ENERGY GENERATING MODULES WITH EXTERIOR WALL FUEL CHAMBERS

(75) Inventor: Jefferey Allen Hunter, Troy, OH (US)

(73) Assignee: F3 & I2, LLC, Troy, OH (US)

( * ) Notice: Subject to any disclaimer, the term of this patent is extended or adjusted under 35 U.S.C. 154(b) by 856 days.

This patent is subject to a terminal disclaimer.

(21) Appl. No.: 12/365,395

(22) Filed: Feb. 4, 2009

(65) Prior Publication Data

US 2010/0192908 A1    Aug. 5, 2010

Related U.S. Application Data

(63) Continuation of application No. PCT/US2009/032933, filed on Feb. 3, 2009.

(51) Int. Cl.
*F02B 77/02* (2006.01)
*F02F 7/00* (2006.01)

(52) U.S. Cl. .................. 123/3; 123/1 A; 123/195 C

(58) Field of Classification Search .......... 123/1 A, 123/195 A, 195 C, 195 S, 3; 220/500; 290/1 A; 180/165

See application file for complete search history.

(56) References Cited

U.S. PATENT DOCUMENTS

| | | |
|---|---|---|
| 1,779,786 A | 10/1930 | Unzue |
| 1,950,234 A | 3/1934 | Ewertz |
| 2,601,634 A | 6/1952 | Rivette |
| 2,927,711 A | 3/1960 | Naggiar |
| 3,781,139 A | 12/1973 | Lohse |
| 3,948,314 A | 4/1976 | Creswick et al. |
| 4,136,432 A | 1/1979 | Melley, Jr. |
| 4,548,164 A | 10/1985 | Ylonen et al. |
| 4,644,705 A | 2/1987 | Saccomani et al. |
| 4,732,360 A | 3/1988 | Bodenheimer |
| 5,181,541 A | 1/1993 | Bodenheimer |
| 5,187,945 A | 2/1993 | Dixon |
| 5,197,627 A | 3/1993 | Disabato et al. |
| 5,316,174 A | 5/1994 | Schutz |
| 5,363,787 A | 11/1994 | Konopasek et al. |

(Continued)

FOREIGN PATENT DOCUMENTS

CH    642418 A5    4/1984

(Continued)

OTHER PUBLICATIONS

International Search Report and Written Opinion pertaining to International application No. PCT/US2009/032933 dated Nov. 3, 2009.

*Primary Examiner* — Hai Huynh
(74) *Attorney, Agent, or Firm* — Dinsmore & Shohl LLP

(57) ABSTRACT

An energy generating module comprises an enclosure, an energy generating device, a fuel chamber, and one or more fuel conveying devices. The enclosure comprises a plurality of walls that enclose the energy generating device. The fuel chamber is applied to an exterior surface of at least one wall of the enclosure such that at least a portion of the exterior surface of at least one enclosure wall is covered by the fuel chamber. The fuel conveying devices convey fuel from the fuel chamber to the energy generating device enclosed by the enclosure walls. The energy generating device generates an energy output using fuel received from the fuel chamber.

19 Claims, 7 Drawing Sheets

U.S. PATENT DOCUMENTS

| | | | |
|---|---|---|---|
| 5,435,270 A | 7/1995 | Newman | |
| 5,460,013 A | 10/1995 | Thomsen | |
| 5,642,827 A | 7/1997 | Madsen | |
| 5,651,330 A | 7/1997 | Jewett | |
| 5,744,940 A | 4/1998 | Colton et al. | |
| 5,755,349 A | 5/1998 | Brundle | |
| 5,804,946 A | 9/1998 | Gaubatz et al. | |
| 6,206,252 B1 | 3/2001 | Broadus | |
| 6,216,957 B1 | 4/2001 | Turunen, Jr. | |
| 6,393,775 B1 | 5/2002 | Staschik | |
| 6,422,018 B1 | 7/2002 | Tisdale et al. | |
| 6,520,124 B2 | 2/2003 | Bohm, II | |
| 6,601,542 B2 | 8/2003 | Campion | |
| 6,615,741 B2 | 9/2003 | Fecko et al. | |
| 6,973,947 B2 | 12/2005 | Penaloza et al. | |
| 7,081,682 B2 | 7/2006 | Campion | |
| 7,351,485 B2 | 4/2008 | Shioya | |
| 7,475,656 B2 * | 1/2009 | Yatsenko | 123/1 A |
| 7,589,429 B2 * | 9/2009 | Hunter | 290/1 A |
| 7,608,934 B1 * | 10/2009 | Hunter | 290/4 R |
| 7,619,319 B1 * | 11/2009 | Hunter | 290/4 R |
| 2005/0184000 A1 | 8/2005 | Jowett | |
| 2006/0279976 A1 | 12/2006 | Witten et al. | |
| 2010/0025409 A1 * | 2/2010 | Hunter | 220/567.2 |
| 2010/0060016 A1 * | 3/2010 | Hunter | 290/1 R |
| 2010/0060093 A1 * | 3/2010 | Hunter | 310/89 |

FOREIGN PATENT DOCUMENTS

| | | |
|---|---|---|
| DE | 10045921 A1 | 3/2002 |
| EP | 0428113 A1 | 5/1991 |
| EP | 0 445 047 A1 | 9/1991 |
| EP | 0485978 A1 | 5/1992 |
| EP | 0594226 A2 | 4/1994 |
| FR | 2129215 A5 | 10/1972 |
| FR | 2558806 A1 | 8/1985 |
| JP | 50-32733 U | 4/1993 |
| JP | 06-108869 A | 4/1994 |
| JP | 2001-065360 A | 3/2001 |
| WO | 9525053 A1 | 9/1995 |
| WO | 2004052755 A1 | 6/2004 |
| WO | 2007027130 A1 | 3/2007 |
| WO | 2007091270 A2 | 8/2007 |

* cited by examiner

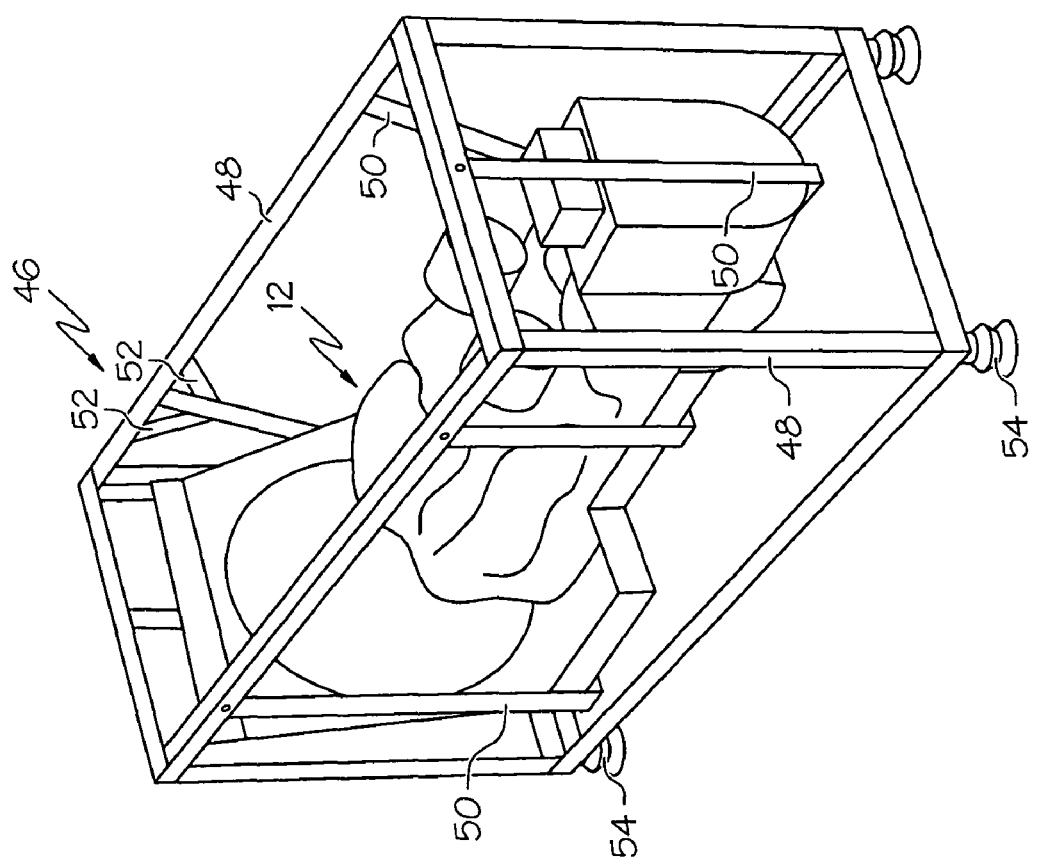

ENERGY GENERATING MODULES WITH EXTERIOR WALL FUEL CHAMBERS

CROSS-REFERENCE TO RELATED APPLICATIONS

The present application is filed under 35 U.S.C. 111(a) as a continuation of International Patent Application No. PCT/US09/32933 (HUR 0012 PB), filed Feb. 3, 2009, which international application designates the United States.

BACKGROUND

Conventional power generating systems generally are used to generate electric power either in remote areas where access to electricity is limited or in urban areas to provide backup power during power outages. More particularly, such conventional systems typically utilize a diesel engine to generate the needed electric power, which may be used for both prime (primary source) and backup (redundant source) power. Power generating systems commonly are used for industrial, construction, mining, oil and gas exploration, and other commercial applications. For example, for industrial applications, the systems may be used to support prime and/or backup electric power for factories; for construction, mining, and oil and gas exploration applications, the systems may be used to generate prime power for the operation of equipment, given that the locations of such activities often are too remote and distant from municipal power grids; and, for commercial applications, the systems may provide backup electric power for electrical systems should the municipal power grid temporarily lose power due to a storm, natural disaster, sabotage, etc.

Power generating systems typically generate significant amounts of noise, are very expensive, and may be transportable from one location to another. As such, power generating systems generally are enclosed in order to reduce the amount of noise escaping to the surrounding outside environment, to protect the engine and other components from theft and environmental conditions, and to facilitate their transportation. A common enclosure for power generating systems are standard shipping containers, such as ISO (International Organization for Standardization) shipping containers. Enclosure of power generating systems within such containers enables the systems to be easily and rapidly deployed to variously located job sites. Another common enclosure for power generating systems are drop-over enclosures that may be designed in a variety of dimensions and configurations. Drop-over enclosures typically are used for power generating systems intending to have a fixed location, such as atop a commercial building.

Depending upon the unique customer requirements, which, in large part, may be dictated by federal, state, and local laws, additional equipment may be needed to operate and support the power generating systems. This equipment may include, but is not limited to, the following: DC lighting systems, electrical controls such as switchgear or a voltage changeover board, sound attenuation, fire suppression systems, personnel doors, fuel tank, louvers for ventilation, and an exhaust system. With the footprint of the enclosure often being constrained, due to the power generating system's proximity to buildings, equipment, etc., designers of power generating systems may seek to minimize the dimensions of internal components of the power generating system, including the engine, such that the overall footprint of the enclosure may be minimized. Alternatively, when using a standard shipping container, the outside dimensions are fixed. Therefore, all of the required components must be sized so as to fit inside of the container.

Power generating systems using liquid fuels, such as petroleum-based fuels, may present problems in attempting to minimize sizes of necessary components. For not only must fuel tanks meet all federal, state, and local laws, but fuel tanks must also fulfill the engine's fuel supply requirements within the available space of the enclosure. Therefore, there is a desire to maximize the size of the fuel tank in order reduce the frequency of necessary and costly re-fuelings of the power generating system that competes with the desire to minimize the size of the energy generating modules and their components.

Further, conventional fuel tanks are designed and built in cylindrical, square, and rectangular shapes as discrete components connected to the engine via tubes and hoses. Given the size and shape of existing liquid fuel engines most commonly used, designers generally must install the fuel tank in the nose (front), in the tail (rear), or beneath the engine. If the fuel tank is to meet Underwriters Laboratories' standards for fuel containment, then the fuel tank must be double-walled such that if an exterior wall is pierced, an uncompromised interior wall prevents the fuel from leaking. Also, conventional fuel tanks may create uneven surfaces within interiors of the power generating systems, particularly in workspace areas. For example, if a fuel tank is positioned below the engine, its exterior walls may create a trip hazard and/or create uneven floor or wall surfaces, making it more difficult for a designer to optimize space within the interior of the power generating system.

SUMMARY

Embodiments of the present invention relate generally to energy generating modules. More particularly, embodiments relate generally to energy generating modules that respectively comprise an enclosure, an energy generating device, and a fuel chamber, wherein the fuel chamber is applied to an exterior wall of the enclosure.

In accordance with one embodiment, an energy generating module comprises an enclosure, an energy generating device, a fuel chamber, and one or more fuel conveying devices. The fuel chamber comprises a primary containment tank to contain fuel and is enclosed by a secondary containment tank, the primary and secondary containment tanks separated by one or more interstitial spaces. The enclosure comprises a plurality of enclosure walls that enclose the energy generating device. The fuel chamber is applied to an exterior surface of at least one of the enclosure walls such that at least a portion of the exterior surface of the at least one enclosure wall is covered by the fuel chamber. The fuel conveying devices convey fuel from the fuel chamber to the energy generating device enclosed by the enclosure walls. The energy generating device generates an energy output using fuel received from the primary containment tank of the fuel chamber.

In accordance with another embodiment, an energy generating module further comprises one or more fuel sensors and one or more sealable ports. The interstitial spaces separating the primary and secondary containment tanks collect fuel leaking from the primary containment tank into the interstitial spaces. The fuel sensors are positioned in the interstitial spaces and in the primary containment tank to sense a presence of fuel in the primary containment tank and a leaking of fuel from the primary containment tank into the interstitial spaces. The sealable ports permit passage of fuel to and from the primary containment tank of the fuel chamber.

In accordance with yet another embodiment, an energy generating module comprises an enclosure, an energy generating device, and one or more fuel conveying devices. The enclosure comprises a plurality of enclosure walls that enclose the energy generating device. The fuel chamber is applied to an exterior surface of at least one of the enclosure walls such that at least a portion of the exterior surface of the at least one exterior enclosure wall is covered by the fuel chamber. The fuel conveying devices convey fuel from the fuel chamber to the energy generating device enclosed by the enclosure walls. The energy generating device generates an energy output using fuel received from the fuel chamber.

BRIEF DESCRIPTION OF THE DRAWINGS

The following detailed description of specific embodiments can be best understood when read in conjunction with the following drawings, where like structure is indicated with like reference numerals and in which:

FIG. 7 is an illustration of a perspective view of a modular cage supporting an energy generating device for an energy generating module according to another embodiment.

Figure 1:
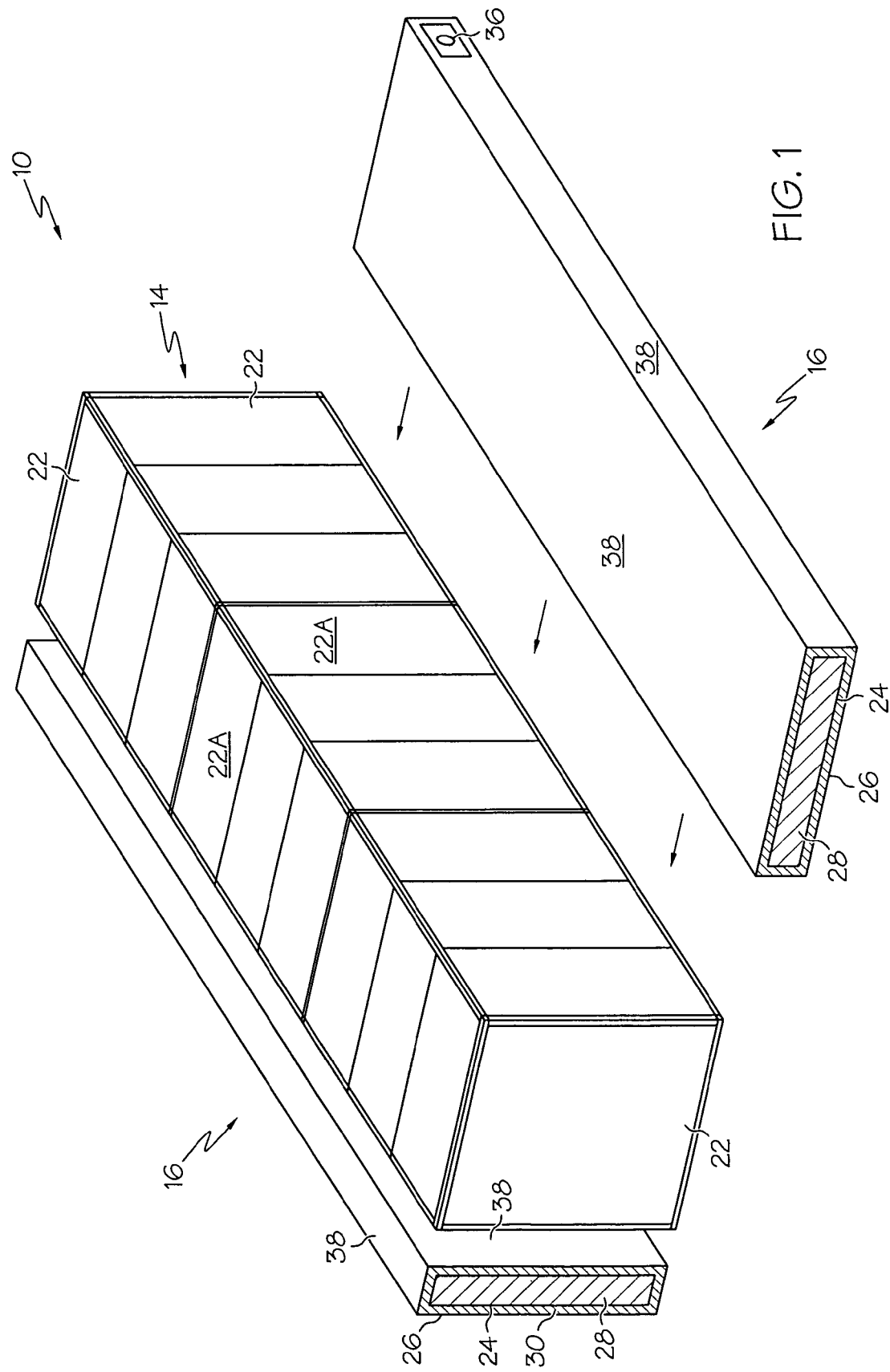
FIG. 1 is an illustration of a perspective view of an energy generating module with a plurality of fuel chambers for application to a plurality of walls of an enclosure according to one embodiment.

The embodiments set forth in the drawings are illustrative in nature and are not intended to be limiting of the embodiments defined by the claims. Moreover, individual aspects of the drawings and the embodiments will be more fully apparent and understood in view of the detailed description.

DETAILED DESCRIPTION

Embodiments of the present invention relate generally to energy generating modules. These energy generating modules respectively comprise an enclosure, an energy generating device, and a fuel chamber. The energy generating device may utilize fuel contained in the fuel chamber to generate an energy output. For example, but not by way of limitation, the energy generating device may be a generator engine that generates electric power output, a boiler that generates heat and/or warm air output, a chiller that generates cool air output, an air compressor that generates forced air output, or any other energy generating device configured to generate or otherwise produce an energy output. Solely for purposes of simplifying the description of various embodiments of the present invention, the disclosure provided herein relates primarily to energy generating modules that respectively comprise an energy generating device configured to generate an electric power output using fuel received from a fuel chamber of the energy generating module. As such, the disclosure provided herein is not limited to energy generating modules that generate electric power and may be applied to any energy generating module that may generate any energy output, as described herein. Further, it is contemplated that the fuel chambers, as described herein and illustrated in the Figures, need not necessarily contain fuel. Rather, the fuel chambers may be used to contain any other liquid or material, such as, but not limited to water or insulation, that may be used for any variety of purposes, such as, but not limited to, cooling or insulating the energy generating device. It is also contemplated that one or more fuel chambers may contain fuel, while one or more other fuel chambers may contain another liquid or material. Further, as used herein, the term "module" refers to any configurable enclosure, whether transportable or fixed at a location, capable of enclosing an energy generating device to produce an energy output for any variety or combination of uses.

Figure 3:
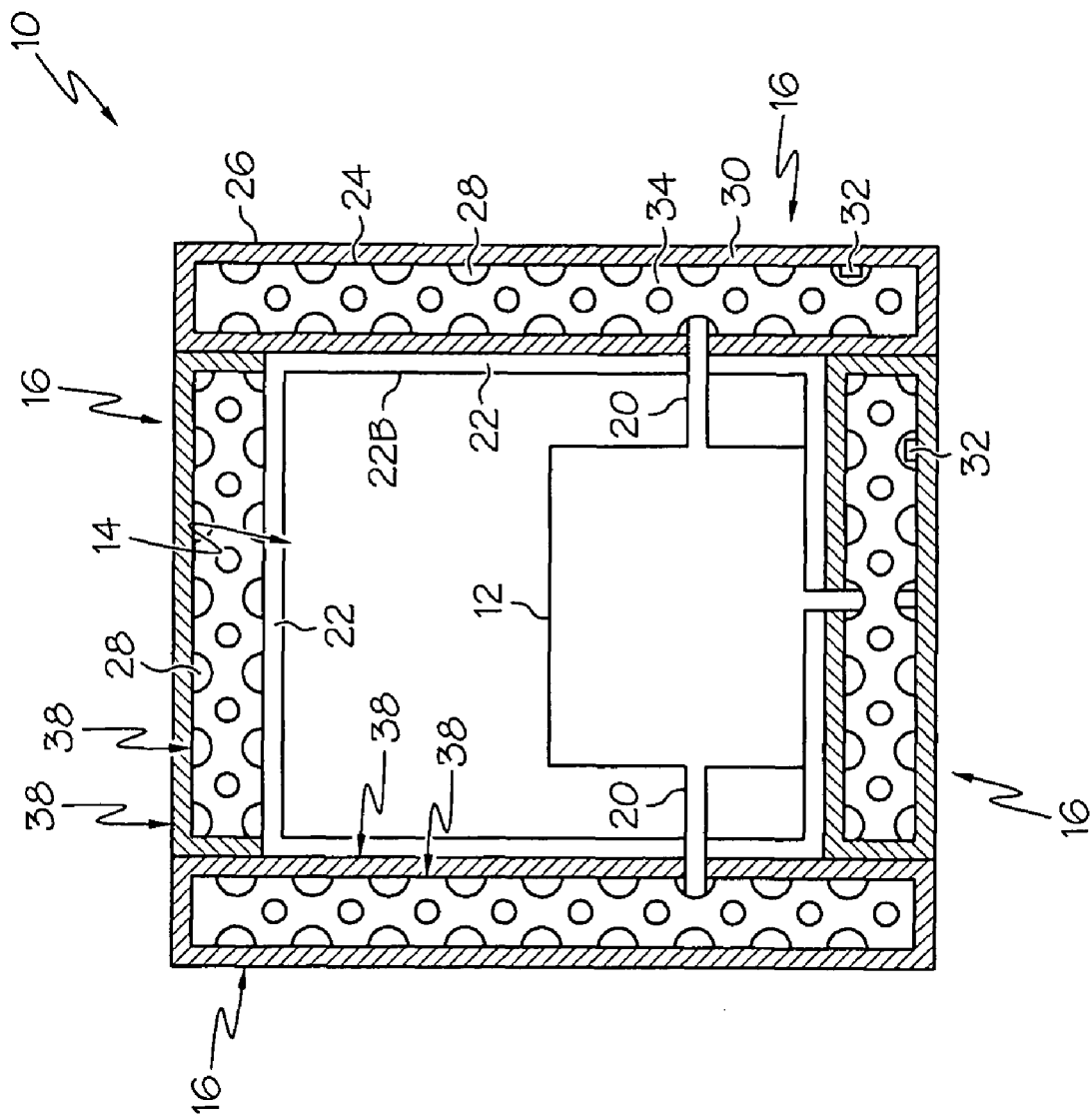
FIG. 3 is an illustration of a cross-sectional end view of an energy generating module with an enclosure enclosing an energy generating device and with a plurality of double-walled fuel chambers applied to a plurality of walls of the enclosure according to another embodiment.
Figure 5:
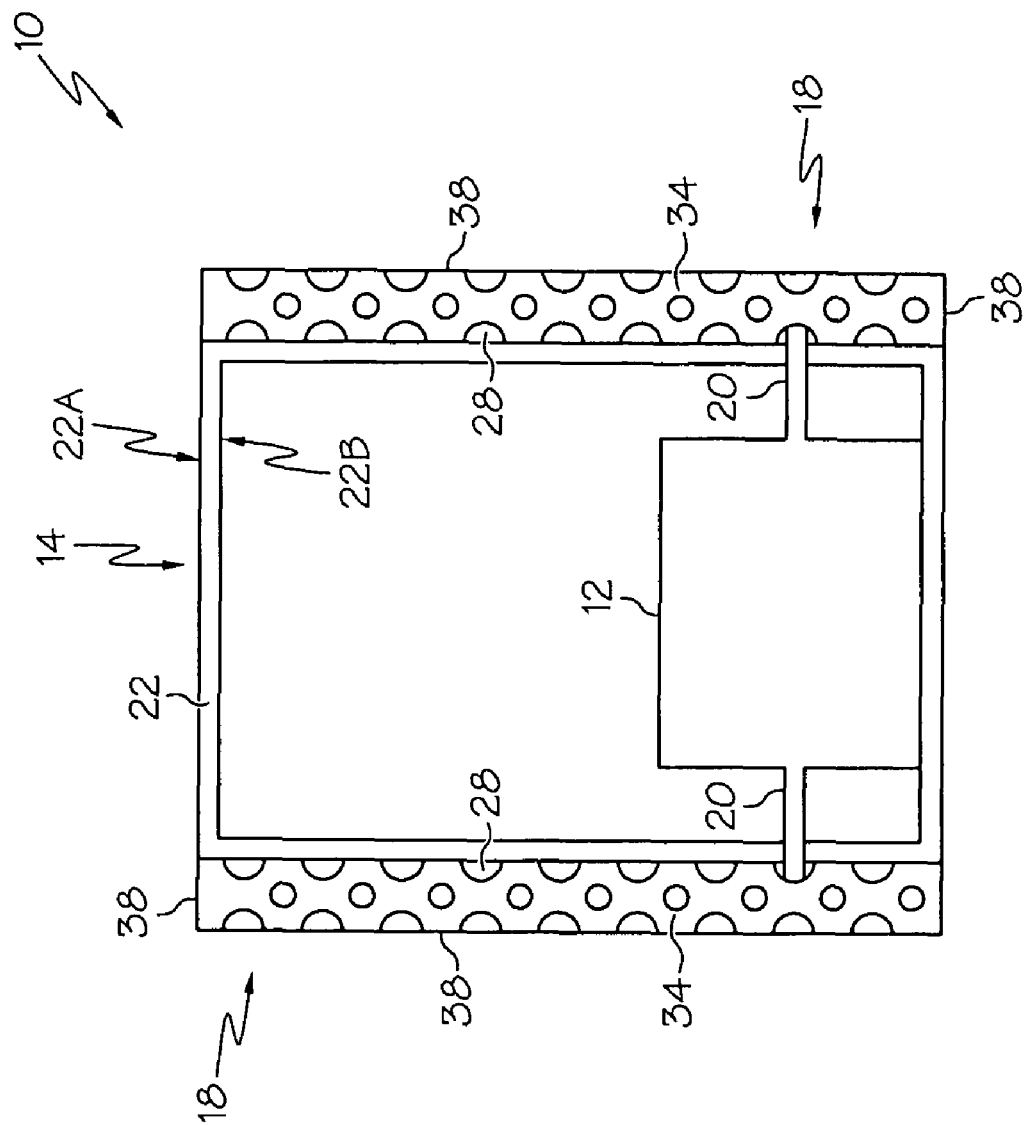
FIG. 5 is an illustration of a cross-sectional end view of an energy generating module with an enclosure enclosing an energy generating device and with a plurality of single-walled fuel chambers applied to a plurality of walls of the enclosure according to another embodiment.

Referring initially to FIGS. 3 and 5, an energy generating module 10 generally comprises an energy generating device 12, an enclosure 14, a fuel chamber 16/18, and one or more fuel conveying devices 20. The energy generating device 12 generally, but not necessarily, is an fuel-driven engine configured to generate electric power. The energy generating device 12 may be, for example, a turbine engine, a reciprocating engine, an electric/gasoline (or other hybrid) engine, a combined heat and power engine (CHP), which may be used to direct the heat generated by the engine to a nearby facility for a productive use, a hydrogen fuel cell engine, a solar-powered engine, or a wind-driven engine. In fact, the energy generating module 10 may comprise one or more of any combination of energy generating devices 12 to enhance flexibility and/or energy generation of the energy generating module 10. With respect to the exemplary wind-driven engine embodiment, wind turbines, for example, may be mounted onto the enclosure 14 to generate electric power, whether during transportation or while the energy generating module 12 is stationary. With respect to the exemplary solar-powered engine, solar panels, for example, may be provided to the roof or sides of the enclosure 14 to generate electric power. The energy generating module 10 may comprise a battery or other charge-storing device such that electric power generated by the energy generating device 12 may be discharged at a later time. The energy generating device 12 is enclosed by the enclosure 14 of the energy generating module 10 and generally may be accessed only by authorized personnel.

The enclosure 14 may be any structure having a roof, a floor, a pair of sidewalls, and a pair of end-walls that, when connected, provide a chamber-like interior capable of enclosing the energy generating device 12, and various other components associated with generating an energy output, such as electric power, and of serving as a workspace for personnel. As such, the enclosure 14 may be, for example, an ISO container, a drop-over enclosure, a railway freight car, or any other enclosure or container configured to perform the purposes described herein. The enclosure 14 may be configured of any variety of different materials, such as, but not limited to, fiberglass, aluminum, stainless steel, carbon steel, or FRP (fiberglass-reinforced plastic). While the enclosure 14 generally may be configured of carbon steel, any alternative material suitable for performing the tasks described herein and in the art may be utilized. Further, the enclosure 14 may be attached directly to a chassis system to facilitate transportation of the energy generating module 10 over roads or rails.

As shown in FIGS. 1-6, the enclosure 14 of the energy generating module 10 generally comprises a plurality of enclosure walls 22. Respective exterior surfaces 22A of the enclosure walls 22 define an exterior of the energy generating module 10, while respective interior surfaces 22B of the enclosure walls 18 define an interior of the energy generating module 10. As such, the enclosure walls 22 define the exterior and interior roof, floor, sidewalls, and endwalls of the enclosure 14 of the energy generating module 10. While the enclosure walls 22 generally are linear, it is contemplated that one or more of these walls 22 may be curved. Thereby, the interior of the energy generating module 10, the exterior of the energy generating module 10, or both, may assume a circular or semi-circular, or otherwise curved shape. Curved walls may enhance the ability of the enclosure 14 to reduce the noise emanating from the energy generating device 12 that escapes the enclosure 14 to the surrounding outside environment. Further, curved walls may comprise one or more channels to substantially direct noise though specially designed ports to minimize the amount noise projected to the outside environment. The exterior and interior walls 22, whether linear or curved, or combinations thereof, cooperate to form at least a portion of the fuel chamber 16/18 of the energy generating module 10.

The fuel chamber 16/18 contains fuel for use by the energy generating device 12 in generating an electric power. The fuel chamber 16/18 may be a double-walled fuel chamber 16 or single-walled fuel chamber 18, as described in greater detail herein. Additional embodiments of fuel chambers are contemplated wherein the fuel chambers are configured as any multiple-wall structures, whether double-wall, triple-wall, or other, that comprise a plurality of containment tanks.

Figure 2:
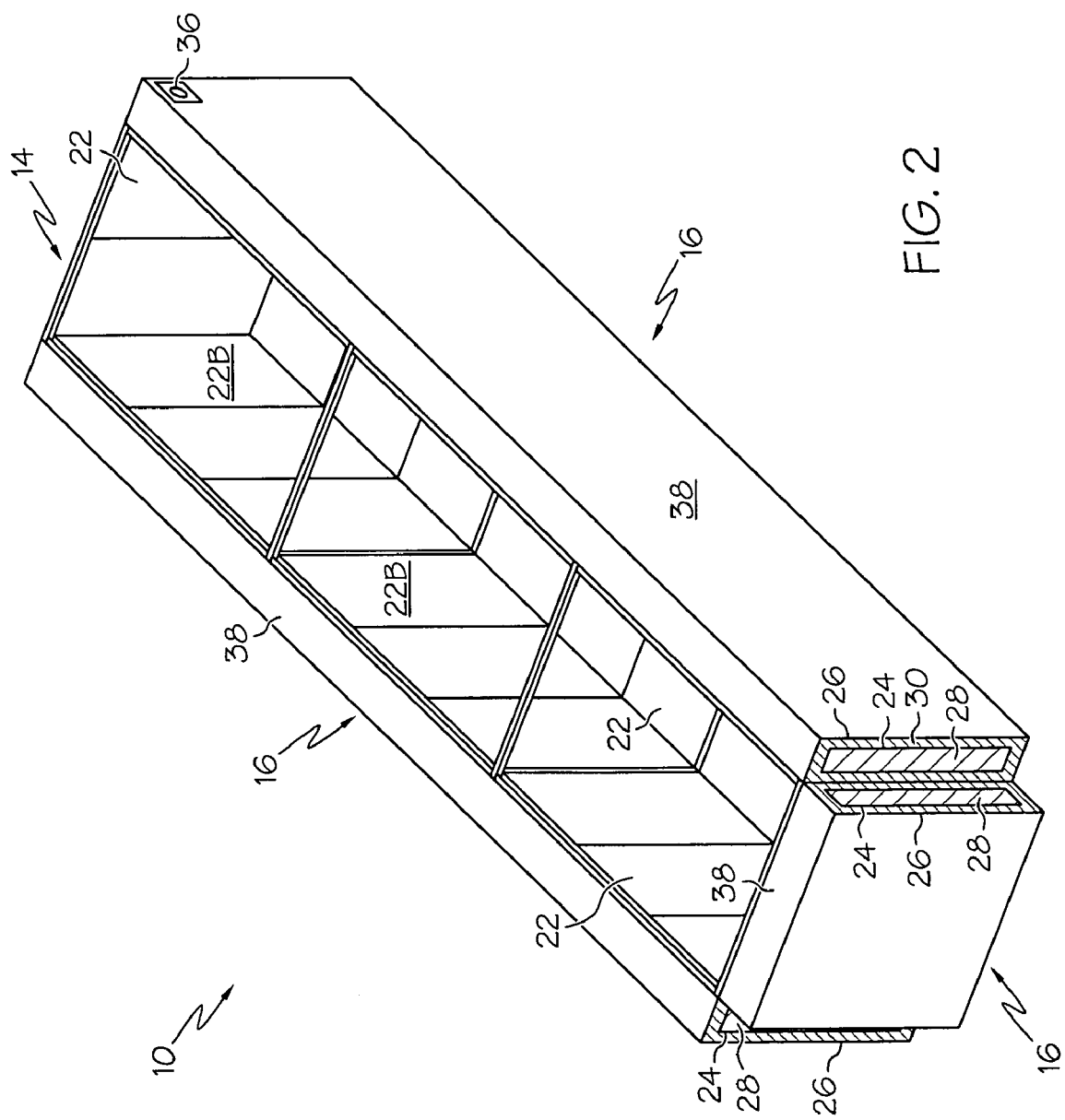
FIG. 2 is an illustration of a perspective view of an energy generating module with an exposed interior of an enclosure and with a plurality of fuel chambers applied to a plurality of walls of the enclosure according to another embodiment.

As shown in FIGS. 1-3, the double-walled fuel chamber 16 of the energy generating module 10 may comprise a primary containment tank 24 enclosed by a secondary containment tank 26. The primary containment tank 24 may comprise one or more cells 28 to contain fuel. The thickness of the primary and secondary tanks 24, 26 generally is determined in accordance with the amount of fuel to be contained therein. Alternatively, as shown in FIGS. 4 and 5, the single-walled fuel chamber 18 of the energy generating module 10 may be described as a single containment tank that may comprise one or more cells 28 to contain fuel, as opposed to the double-walled fuel chamber 16 described above comprising a primary containment tank 24 enclosed by a secondary containment tank 26.

The fuel chamber 16/18 of the energy generating module 10 generally is configured as a hermetically sealed fuel chamber applied to an exterior surface 22A of at least one of the enclosure walls 22. More particularly, one or more fuel chambers 16/18 may be applied to the respective exterior surfaces 22A of the existing enclosure walls 22 (roof, floor, sidewalls, and/or endwalls) for positioning of the fuel chambers 16/18 about the exterior of the enclosure 14.

Figure 6:
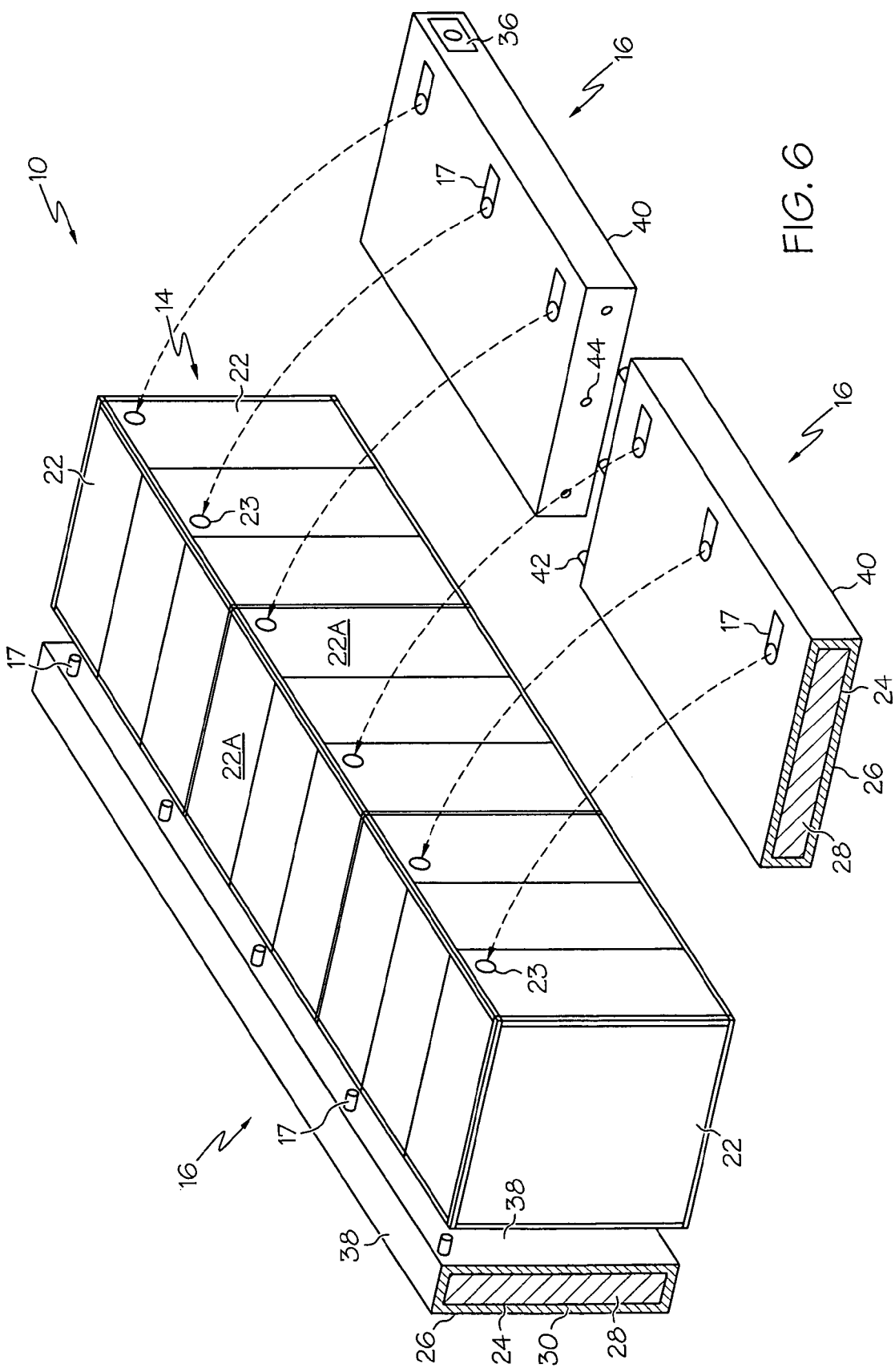
FIG. 6 is an illustration of a perspective view of an energy generating module with a plurality of fuel chambers for application to a plurality of walls of an enclosure according to another embodiment.

As used herein with respect to the fuel chambers 16/18, "applied to" refers to a fuel chamber 16/18 secured to, fastened to, connected to, suspended from, supported by, adhered to, built-out from, etc., and combinations thereof, an exterior surface 22A of an enclosure wall 22. For example, as shown in FIG. 6, a fuel chamber 16 may be applied to the exterior surface 22A of the enclosure wall 22 by suspending one or more pins 17 of the fuel chamber 16 in one or more recesses 23 in the exterior surface 22A of the enclosure wall 22 such that the fuel chamber 16 may be applied to and removed from the enclosure wall 22 with engagement and disengagement of the pins 17 and recesses 23. By way of another example, a fuel chamber 16/18 may be applied to the exterior surface 22A of the enclosure wall 22 by securing with one or more securing devices, such as, but not limited to, clamps, bolts, nuts, etc., the fuel chamber 16/18 to the enclosure wall 22. In addition, by way of yet another example, the fuel chamber 16/18 may be applied to the exterior surface 22A of the enclosure wall 22 by supporting the fuel chamber 16/18 with a support extending horizontally from the enclosure wall 22 to under the fuel chamber 16/18 and by adhering the fuel chamber 16/18 with a paste or tape or other adherent substance or device to the exterior wall 22A of the enclosure 22.

Figure 4:
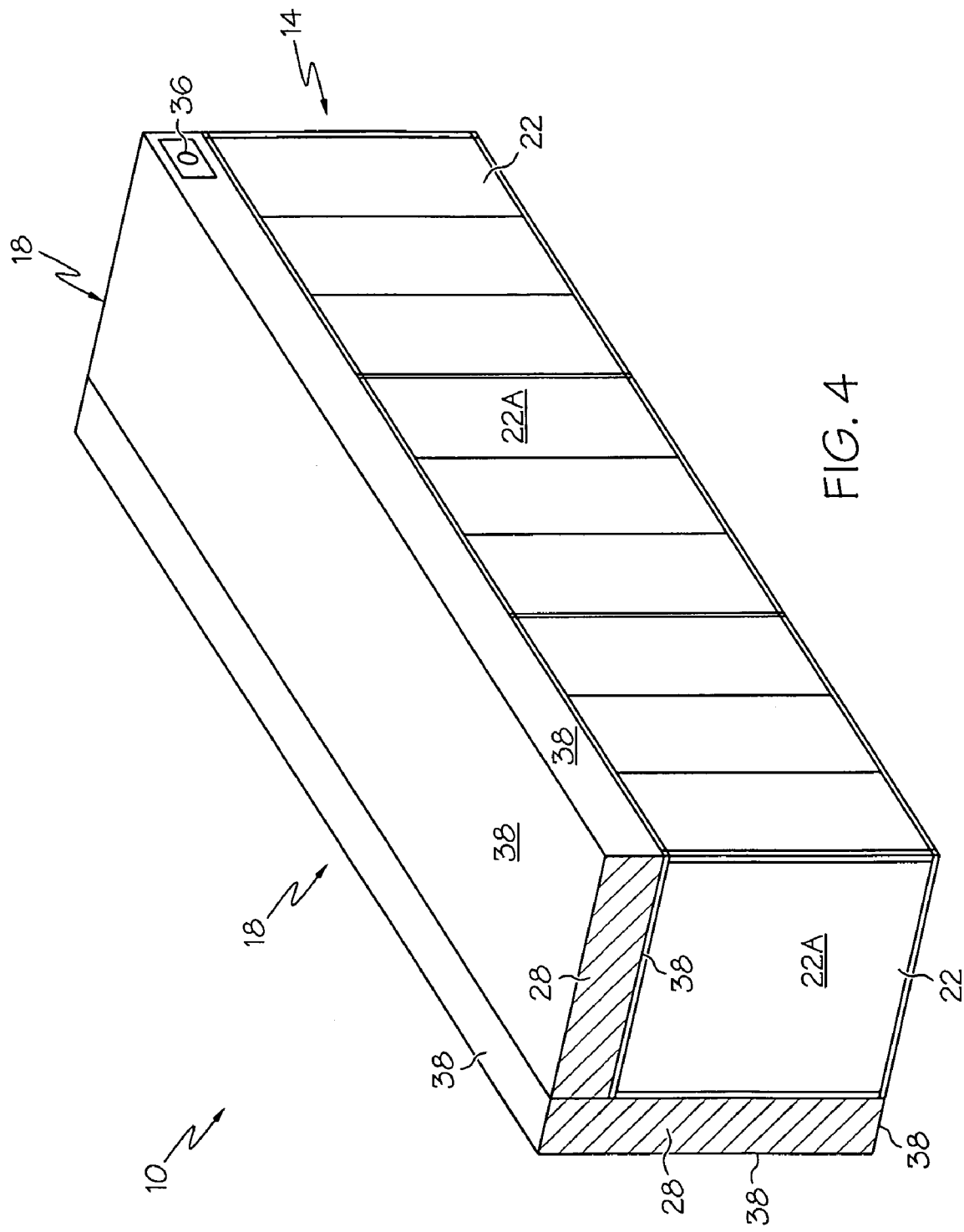
FIG. 4 is an illustration of a perspective view of an energy generating module with a plurality of fuel chambers applied to a plurality of walls of an enclosure according to another embodiment.

As shown in FIGS. 1-5, it is contemplated that the fuel chamber, as either a double-walled structure 16 or as a single-walled structure 18, may be a fully closed structure. More particularly, as shown in FIGS. 1-3, walls 38 of a secondary containment tank 26 may fully enclose walls 38 of a primary containment tank 24 or, as shown in FIG. 4, walls 38 of a single-walled fuel chamber 18 may be connected to form a fully closed structure. A wall 38 of the secondary containment tank 26 of a double-walled fuel chamber 16 or a wall 38 of a single-walled fuel chamber 18 along which the fuel chamber 16/18 is applied to the exterior surface 22A of the enclosure wall 22 generally is positioned alongside and directly over the exterior surface 22A of the enclosure wall 22. Thereby, this wall 38 of the secondary containment tank 26 or the single-walled fuel chamber 18, and, thus, the fuel chamber 16/18, may be applied to the exterior surface 22A of the enclosure wall 22.

As shown in FIGS. 3 and 5, it is also contemplated that a fuel chamber, as either a double-walled structure 16 or as a single-walled structure 18, may be a partially closed structure. More particularly, walls 38 of a secondary containment tank 26 may only partially enclose walls 38 of a primary containment tank 24 or walls 38 of a single-walled fuel chamber 18 may be connected to form a partially closed structure. As mentioned above, a wall 38 of the secondary containment tank 26 of a double-walled fuel chamber 16 or a wall 38 of a single-walled fuel chamber 18 along which the fuel chamber 16/18 is applied to the exterior surface 22A of the enclosure wall 22 generally is positioned alongside and directly over the exterior surface 22A of the enclosure wall 22. When, however, that wall 38 of the secondary containment tank 26 is absent or removed in its entirety or is only partially provided, then the enclosure wall 22 to which the fuel chamber 16/18 is applied may serve as the missing wall or complete the partial wall of the secondary containment tank 26 or the single-walled fuel chamber 18 and, thereby, complete the fuel chamber 16/18 to a fully closed structure. For example, as shown in FIG. 3 with a fuel chamber 16 applied to an exterior surface 22A of a roof enclosure wall 22, a secondary containment tank 26 at least partially open on a wall 38 along which the fuel chamber 16 is applied to the exterior surface 22A of the enclosure wall 22 such that the enclosure wall 22 to which the at least partially open wall 38 of the secondary containment tank 26 is applied serves both as a wall of the enclosure 14 and as a closure of the at least partially open wall 38 of the secondary containment tank 26. Further, by way of another example, as shown in FIG. 5 with a fuel chamber 18 applied to an exterior surface 22A of a side enclosure wall 22, a single-walled fuel chamber 18 at least partially open on a wall 38 along which the fuel chamber 18 is applied to the exterior surface 22A of the enclosure wall 22 such that the enclosure wall 22 to which the at least partially open wall 38 of the fuel chamber 18 is applied serves both as a wall of the enclosure and as a closure of the at least partially open wall 38 of the fuel chamber 18. It is contemplated that such embodiments comprising fuel chambers 16/18 as partially closed structures that are completed to fully closed structures through application to enclosure walls 22 may significantly reduce the amount of time and material consumed in forming the fuel chambers 16/18 as an entire wall, or a portion thereof, may be left out of the manufacturing process.

It is also contemplated from FIGS. 3 and 5 that a fuel chamber 16/18 may be built-out from an exterior surface 22A of an enclosure wall 22. More particularly, material may be constructively applied to the exterior surface 22A of the enclosure wall 22 so as to extend from and at least partially about the enclosure wall 22 such that the applied material forms one of either a primary containment tank or a secondary containment tank 26 of a double-walled fuel chamber 16, or a wall 38 of a single-walled fuel chamber 18. Thereby, the enclosure wall 22 from which the fuel chamber 16/18 is built-out serves both as a wall 22 of the enclosure 14 and as a wall 38 of one of a primary containment tank 24 and a secondary containment tank 26 of a double-walled fuel chamber 16 or as a wall 38 of a single-walled fuel chamber 18.

Positioning the fuel chamber 16/18 about the exterior of the enclosure 14 offers greater flexibility in designing the fuel chamber 16/18 and the energy generating module 10, reduces the materials and labor required to build a fuel chamber 16/18, and eliminates trip hazards when compared with conventional power generating system fuel tanks typically having perpendicular joints exposed in the interior workspace of the enclosure. Also, the configuration of embodiments of the present energy generating module 10 with the fuel chamber 16/18, and fuel contained therein, positioned about at least a portion of the exterior of the enclosure 14, and the energy generating device 12 enclosed therein, may provide significant sound attenuation of the noise generated by the energy generating device 12. Thereby, baffles and/or other sound-deafening materials positioned within and/or about an exterior of an energy generating system and/or the energy generating device, as commonly found in the art, is not needed, saving additional time, material, labor, and money involved in construction.

Further, the fuel chamber, both double-walled 16 and single-walled 18 embodiments, potentially provide significantly more cubic space for fuel containment given the amount of square feet along as many as all six of the enclosure walls 22 can provide significantly more fuel capacity when compared to conventional energy generating system fuel tanks. Therefore, depending upon the rate of fuel consumption, the runtime of the energy generating module 10 in generating electric power may increase significantly and may require far fewer re-fueling trips for a fuel tanker and manpower to re-fuel the energy generating module 10 in comparison to conventional power generating system fuel tanks.

More particularly, the fuel chamber 16/18 may be configured to contain any desirable amount of fuel. In one exemplary embodiment, the primary containment tank 24 is configured to contain cumulatively about 1,500 gallons of fuel in a 20 foot standard ISO container having a double-walled fuel chamber 16 with about 150% containment, whereas, a conventional fuel tank in a 20 foot standard ISO container generally holds only about 750 gallons and, thus, provides only about 50% of the runtime of the energy generating device in comparison to the present exemplary embodiment. Further, in another exemplary embodiment, the primary containment tank 24 is configured to contain cumulatively about 3,000 gallons of fuel in a 40 foot standard ISO container having a double-walled fuel chamber 16 with about 150% containment, whereas, a conventional fuel tank in the same sized container generally holds only about 1,500 gallons. In addition, with respect to additional exemplary embodiments of double-walled fuel chambers 16 that provide about 200% containment, the primary containment tank 24 may be configured to contain cumulatively about 1,100 gallons of fuel in a 20 foot standard ISO container or about 2,200 gallons of fuel in a 40 foot standard ISO container. Conversely, conventional fuel tanks generally hold only about 550 and 1,100 gallons of fuel in 20 foot and 40 foot standard ISO containers, respectively. Therefore, embodiments of double-walled fuel chambers 16 may provide about 200% of the fuel storage capacity generally available with conventional fuel tanks. It is anticipated that embodiments of single-walled fuel chambers 18 described herein may provide even greater than 200% of the fuel storage capacity generally available with conventional fuel tanks as a limiting factor to fuel storage capacity for conventional fuel tanks is their respective heights, which, with the fuel tanks being confined within an interior space of the enclosure, is restricted by the height of the interior workspace within the enclosure.

With respect to the double-walled fuel chamber 16, the primary and secondary containment tanks 24, 26 may be separated by one or more interstitial spaces 30. The width of the interstitial space 30 between the primary and secondary containment tanks 24, 26 may be determined by regulations or industry standards. While the primary containment tank 24 may be hermetically sealed to substantially preclude fuel leakage therefrom, leakage may occur due to a manufacturing defect in the energy generating module 10, a compromising of the secondary containment tank 26 from collision with or puncturing by a foreign object, or other reason. As such, the interstitial spaces 30 may be configured to collect fuel that may leak from the primary containment tank 24. It is also contemplated that the secondary containment tank 26 may also be hermetically sealed so as to substantially preclude fuel leakage from the interstitial spaces 30 and the fuel chamber 16.

In addition, one or more of the interstitial spaces 30 may be at least partially filled with concrete, insulation, or other matter to further attenuate noise emanating from the energy generating device 12 and to restrict the puncturing of both the primary and secondary containment tanks 24, 26 with a foreign object. This insulating matter may be further configured or provided in such a way within the interstitial spaces 30 to permit a flow of fuel therethrough so as not to obstruct fuel from appropriate sensing by the energy generating module 10, as described in greater detail below. Further, dimensions of the interstitial spaces 30 may be maintained by a brace that may be welded perpendicularly to the walls of the primary and secondary containment tanks 24, 26. This brace may be configured to support these walls and to allow fuel to pass therethrough should there be a leak in the primary containment tank 24.

As shown in FIG. 3, the energy generating module 10 may comprise one or more fuel sensors 32 positioned in the interstitial spaces 30 to sense a presence of fuel therein due to a leak in the primary containment tank 24. The interstitial spaces 30 generally are configured to direct fuel collected therein to a position of the fuel sensor 32 for sensing. Also, the energy generating module 10 may comprise one or more fuel sensors in the cells 28 of the primary containment tank 24 or in the single-walled fuel chamber 18 to sense levels of fuel contained therein and to notify an operator of the energy generating module 10 of a need to re-fuel.

Further, the fuel chambers 16/18 may be configured in any variety of dimensions. These dimensions may be defined to establish specific standards or may be customized to customer needs. For example, generally speaking, United States law allows (without a permit) trailer loads of 102 inches in width to be transported over the road network. Fuel chamber 16/18 dimensions may be standardized such that one or more fuel chambers 16/18 may be applied to one or more enclosure walls 22 of an enclosure 14 to form an energy generating module 10 having a width of 102 inches. Conversely, conventional ISO containers are only 96 inches in width, despite general legal permission to be wider. As such, energy generating module 10 formed by an enclosure 14 and one or more fuel chambers 16/18 may comprise significantly greater dimensions than the conventional ISO container (e.g., up to 6 inches of additional width along an entire length of the enclosure). For example, in one embodiment, the enclosure 14 is a conventional ISO container comprising a width of about 96 inches. One or more fuel chambers 16/18 are applied to at least one side enclosure wall 22 of the ISO container enclosure 14. The one or more fuel chambers 16/18 cumulatively comprise a width of about 6 inches such that a width of the energy generating module 10 is about 102 inches.

It is contemplated that the fuel chambers 16/18 may be configured in any variety of shapes. For example, while the fuel chambers 16/18 are illustrated in FIGS. 1-6 in a rectangular shape, the fuel chambers 16/18 alternatively may assume a square shape or even a triangular shape. It also is contemplated that the fuel chambers 16/18 may be configured as inter-connectable modular panels of one or more of any variety of shapes. For example, as shown in FIG. 6, the fuel chambers 16 may be configured as modular panels 40 that are inter-connectable via complementary pins 42 and recesses 44 or other inter-connective features. The pins 42 and recesses 44 may be fluidly coupled to the respective fuel chambers 16/18 and may be fluidly inter-connected so that fuel may flow between the pins 42 and recesses 44 and interconnected modular panel 40 fuel chambers 16/18.

Further, the fuel chambers 16/18 may be configured of any variety of one or more materials. For example, the fuel chambers 16/18 generally are configured of sheet metal for its durability and rigidity. It is contemplated, however, that the fuel chambers 16/18 may be configured of alternative materials in addition to or in lieu of sheet metal. Such alternative materials include, but are not limited to, laminated epoxy, Kevlar® (which may be suitable for military applications), wood, Styrofoam™, and any combinations thereof.

In addition, the fuel chambers 16/18 may be configured with flat exterior surfaces, as shown in FIGS. 1-5. Thereby, the exteriors of the fuel chambers 16/18 may be easily integrated or aligned with flat surfaces of other fuel chambers 16/18, flat, corrugated, or otherwise defined enclosure walls 22, and/or other devices or facilities. Furthermore, the flat exterior surfaces of the fuel chambers 16/18 also facilitate a standardized positioning of holes, fasteners, lifting eyes, etc., to the walls 38 of the fuel chambers 16/18. In addition, the flat exterior surfaces of the fuel chambers 16/18 easily permit the application of decals, banners, or other marketing/branding promotional materials to the flat exterior surfaces exposed on the walls 38 of the fuel chambers 16/18.

To facilitate lifting and moving of the fuel chambers 16/18, lifting eyes and/or other fastening devices may be integrated into the walls 38 of the fuel chambers 16/18 and exposed at corners, or elsewhere, of the fuel chambers 16/18. The lifting eyes may enable the fuel chambers 16/18, and possibly the enclosures 14 to which the fuel chambers 16/18 are applied as well, to be easily lifted and maneuvered. Further, the lifting eyes may be used in positioning and applying the fuel chambers 16/18 to the enclosure walls 22.

Further, the fuel chambers 16/18 may be mass-produced in a variety of standard sizes or may be produced according to custom specifications. The mass-production of the fuel chambers 16/18 permits an energy generating module 10 manufacturer to maintain a supply of variously-sized fuel chambers 16/18 such that once a customer order is submitted, the manufacturer may simply draw from its supply of fuel chambers 16/18 and apply them to the walls 22 of an enclosure 14 to form energy generating modules 10. This can reduce the energy generating module 10 manufacturing time from, for example, about four weeks to about three days/one shift. This enables a manufacturer to maintain a lean manufacturing environment. In addition, while it is contemplated that the fuel chambers 16/18 may be leak tested after application to enclosure walls 22, it may be beneficial to subject the fuel chambers 16/18 to leak testing at the end of the production process prior to application to enclosure walls 22. Thereby, leaks may be more easily identified and repaired and a fuel chamber 16/18 may be replaced or otherwise disposed or recycled prior to application to the enclosure walls 22.

In addition, not only may the primary containment tank 24 and the single-walled fuel chamber 18 be hermetically sealed, as described above, but, also, the cells respective to the primary containment tank 24 and the single-walled fuel chamber 18 may be individually hermetically sealed so as to substantially preclude fuel leakage between the cells and from the cells into the interstitial spaces 30 or from the fuel chamber 16/18. Alternatively, two or more of the cells may be fluidly interconnected such that fuel may flow through the interconnected cells. In addition, one or more cells of the fuel chambers 16/18 of one energy generating module 10 may be connected to one or more cells of the fuel chambers 16/18 of another nearby energy generating module 10. Thereby, a plurality of interconnected energy generating modules 10 may be provided to produce a greater, cumulative electric power output than available through a single, isolated energy generating module 10. For example, but not by way of limitation, multiple adjacent energy generating modules 10 in fluid communication and all configured to and capable of sharing fuel contained in their respective fuel chambers 16/18 through fuel conveying devices 20 may be provided. Further, it is contemplated that energy generating modules 10 supported on chassis or railcars for purposes of transportation may be connected to a tanker truck or tanker railcar that may contain several thousand gallons of fuel in addition to that contained in the fuel chambers 16/18.

Further, the fuel conveying devices 20 convey fuel from the primary containment tank 24 and the single-walled fuel chamber 18 to the energy generating device 12. Thereby, the energy generating device 12 enclosed by the enclosure walls 22 is in fluid communication with the fuel chamber 16/18 via the fuel conveying devices 20. The energy generating device 12 may then generate electric power using fuel received from the primary containment tank 24 or the single-walled fuel chamber 18 by the fuel conveying devices 20. The fuel conveying devices 36 may include, but are not limited to, one or more tubes, hoses, pipes, clamps, valves, seals, and/or other additional or similar devices.

Further, the cells may be supported internally by a plurality of baffles 34 intermittently welded or continuously welded inside of the cells, as shown in FIGS. 1-3. The baffles 34 may be configured to maintain predefined dimensions of the cells. The baffles 34 may be perforated so as to permit passage of fuel therethrough. Further, the baffles 34 may be configured and/or positioned within the cells to further attenuate noise emanating from the energy generating device 12. Sound insulating matter, such as, but not limited to concrete, insulation, or other matter, may also be provided internally to the cells to provide additional noise attenuation benefits while not significantly interfering with a flow of fuel within the cells.

The energy generating module 10 also may comprise one or more sealable ports 36. The sealable ports 36 may permit passage of fuel to and from the primary containment tank 24 and the single-walled fuel chamber 18. The sealable ports 36 generally are positioned above a maximum level of fuel contained in the fuel chambers 16/18 so as to preclude leakage of fuel through the sealable ports 36. It is contemplated, however, that the sealable ports 36 may be positioned at any location on the energy generating module 10. In an embodiment where a sealable port 36 is positioned beneath a maximum level of fuel contained in the fuel chambers 16/18, the sealable port 36, the fuel chamber 16/18, or both, may be configured to prevent, or substantially prevent, fuel from flowing back into and/or through the sealable port 36, thereby precluding leakage of fuel through the sealable port 36.

The provision of multiple sealable ports 36 to the energy generating module 10 offers greater re-fueling flexibility, if access to a sealable port 36 is obstructed or otherwise prevented, and may reduce the time necessary for re-fueling. It is contemplated that where multiple, independent cells are within the primary containment tank 24 or the single-walled fuel chamber 18, a sealable port 36 may be provided to each cell. Thereby, in such embodiments, the independent cells may be filled simultaneously with a common fuel or with various types of fuel, further reducing the time necessary to re-fuel the energy generating module 10. Further, with respect to re-fueling an energy generating module 10, it is contemplated that the fuel may be delivered and provided by any variety of fuel sources. For example, the fuel may be provided by a tanker trailer or a tanker railcar that is transported to the location of the energy generating module 10. By way of another example, the energy generating module 10 itself may be transported to a fuel station or a stationary or immobilized tanker to which the energy generating module 10 may couple to receive fuel.

In addition, the energy generating module 10 may comprise a normal vent and an emergency vent. The primary containment tank 24 and an enclosure wall 22 of the single-walled fuel chamber 18 generally have located on their respective top surfaces both normal and emergency vents that may be used to automatically relieve internal gaseous pressure. The secondary containment tank 26 generally has located at its top surface an emergency vent to relieve excessive pressure that has developed within primary and secondary containment tanks 24, 26 often due to external fire exposure or blockage of the normal vent.

Further, it is contemplated by embodiments of the present invention that a substantially impenetrable coating or other material may be applied to one or more walls of a fuel chamber 16/18 that may render the need for multiple walls, interstitial spaces, and/or secondary containment tanks unnecessary. More particularly, the coating may substantially prevent projectiles or other foreign objects from piercing the wall of a fuel chamber 16/18. This coating, if applied to the walls of a fuel chamber 16/18, may eliminate the need for the secondary containment tank and any protective or insulating material provided therein. This further reduces materials, time, labor, and costs of construction of energy generating modules 10 and permits expansion of the fuel chamber 16/18 to larger dimensions for increased storage of fuel in lieu of the interstitial spaces. The coating may be applied as a liquid that dries to a substantially impenetrable material about the walls of the fuel chamber 16/18. Alternatively, the coating may be a material affixed or otherwise provided about the walls of the fuel chamber 16/18 while in its impenetrable condition, such as in a slab or packaged configuration. It is also contemplated that the coating may assist in attenuating noise generated by the energy generating device 12.

Fuel utilized by the energy generating module 10 and contained in the fuel chambers 16/18 may be contained in a compressed or a non-compressed state. In addition, fuel used by the energy generating device 12 and contained in the fuel chambers 16/18 is not limited to any particular fuel type. Rather, the fuel may be, but is not limited to, any petroleum-based fuel, such as gasoline, propane, diesel, jet fuel, kerosene, or liquefied natural gas, any biofuel, or hydrogen. In fact, individually sealed cells of the fuel chambers 16/18 may contain different types of fuels. This permits not only electric power generation, but also re-fueling of vehicles that use various fuel types. In accordance with embodiments configured to permit refueling of vehicles with fuel dispensed from a fuel chamber 16/18 of an energy generating module 10, the energy generating module 10 may comprise one or more receptacles in fluid communication with the fuel in the fuel chambers 16/18 and configured to be applied to a vehicle for dispensing fuel from the fuel chambers 16/18 into the vehicle's fuel tank. Thereby, not only may a power grid or other electrical system be powered by the energy generating device 12, but a vehicle using any one of a variety of fuel types may be re-fueled with fuel in the fuel chamber 16/18 at the same energy generating module 10. In addition, the storage of various fuel types also enables the energy generating device 12 of the energy generating module 10 to be powered by one or more of any variety of fuel types to generate electric power.

With the energy generating module 10 comprising an energy generating device 12 and a fuel chamber 16/18, along with other components necessary for the generation of electric power, the energy generating module 10 is self-contained and is independent of any outside resources, with the exception of re-fueling the fuel chamber 16/18, that may be needed to generate and discharge electric power and/or fuel. Thereby, the energy generating module 10 may operate independently of personnel, outside of occasional temporary maintenance, refueling, power grid connection/disconnection, and transportation of the energy generating module 10. Remaining operations of the energy generating module 10 may be self-performed by the energy generating modules 10 or may be controlled and/or monitored remotely. With respect to the re-fueling of vehicles, according to one exemplary embodiment, vehicle operators may park their vehicles along side an energy generating module 10, couple a receptacle of the energy generating module 10 to their vehicles, and dispense fuel from fuel chambers 16/18 of the energy generating module 10 to the vehicle for refueling purposes. It is further contemplated that vehicles may couple to a receptacle of the energy generating module to re-energize with whatever form of energy is generated by or otherwise available from the energy generating module 10. For example, vehicles may electrically couple to a receptacle of the energy generating module 10 to re-charge, as opposed to or in addition to re-fuel, with electric power generated by the energy generating module 10. The energy generating modules 10 may be configured such that vehicle operators may to transact fuel/energy purchases through credit card or other payment transactions, eliminating the need for personnel on site to handle payment arrangements. For example, but not by way of limitation, vehicle operators may swipe a credit cards in a card-reading mechanism affixed to and/or linked with the energy generating module 10 to pre-pay for the fuel/energy, as currently offered at most fueling stations.

As mentioned above, the energy generating module 10 generally comprises components in addition to the energy generating device 12 that may be necessary for, or facilitative of, electric power generation. These additional components may include, but are not limited to: an alternator, a battery or other charge storing device, DC lighting systems, electrical controls such as engine switchgear or a voltage changeover board, sound attenuation, fire suppression systems, personnel doors, fuel tank, louvers for ventilation, fan cooling system, and an exhaust system. Any combination of these items may be considered to be an energy generating module 10. The exhaust system may be configured to include environmentally-friendly scrubbers to remove, or substantially remove, toxic or harmful substances from the exhaust generated by the energy generating device 12 of the energy generating module 10, such as NOx. Further, for construction of the energy generating module 10, the energy generating device 12, alternator, electrical controls, air circulation, exhaust systems, and other components may be manufactured in and/or provided by separate facilities. Once constructed and appropriately configured, the energy generating device 12 may be placed within an interior of the energy generating module 10.

Further, as shown in FIG. 7, the energy generating module 10 may comprise a modular cage 46 to support the energy generating device 12, and possibly other components positioned within the interior of the enclosure 22, such as, but not limited to, a radiator and an alternator integrated into the energy generating device 12, during transportation of the energy generating module 10. More particularly, the energy generating device 12 may be supportedly affixed to the modular cage 46 with the assembly thereof being placed into the interior of the enclosure 22. The modular cage 46 may support the energy generating device 12 such that while the modular cage 46 is secured within the interior of the enclosure 22, the energy generating device 12 may sway so as to be self-leveling, or substantially self-leveling with movement of the energy generating module 10 during transportation thereof. By way of example only, the modular cage 46 may function similarly to a gyroscope in maintaining stability through adjustable self-leveling. In addition, or alternative thereto, the modular cage 46 may comprise an independent suspension within the interior of the enclosure 22 to provide self-leveling capabilities to the modular cage 46 and the energy generating device 12. As such, the modular cage 46 may protect the energy generating device 12, and any other components supported by the modular cage 46, from damage during transportation and may substantially reduce tilting of a chassis, trailer, or railcar transporting the energy generating module 10. The modular cage 46 may be designed to fit securely within and according to the dimensions of an enclosure 22. In addition, the modular cage 46 may be designed for repeated, rapid insertion and withdrawal to and from an enclosure 22. For example, one or more guide rails may be secured to an interior floor panel of an enclosure 22 to receive and releasably lock into place the modular cage 46 supporting an energy generating device 12. Such features of the modular cage 46 permit greater flexibility of the energy generating module 10 and the use of its components, which may be interchangeable within enclosures 22 and energy generating modules 10, assuming a "plug-and-play" configuration.

More particularly, the modular cage 46 may comprise a peripheral cage 48 and one or more multi-directional extensions 50. The peripheral cage 48 may be secured to an interior of the enclosure 22. As such, when secured to the interior of the enclosure 22, the peripheral cage 48 sways with the enclosure 22 during transportation of the energy generating module 10. The multi-directional extensions 50 extend from the peripheral cage 48 and support the energy generating device 12 within the enclosure 22. The multi-directional extensions 50 are movable in multiple directions as the peripheral cage 48 sways during transportation of the energy generating module 10. In one exemplary embodiment, the multi-directional extensions 50 each define multiple directions of movement. In another exemplary embodiment, at least one of the multi-directional extensions 50 defines a single direction of movement and the multi-directional extensions 50 collectively define multiple directions of movement. The multi-directional extensions 50, with the ability to move in multiple directions, permit the energy generating device 12 to track its inertial position more closely than the sway of the peripheral cage 48 during transportation of the energy generating module 10. More particularly, the multi-directional extensions 50 may be moveable in multiple directions so as to permit the energy generating device 12 to track its lateral inertial position, its vertical inertial position, or a combination thereof, more closely than the sway of the peripheral cage 48 during transportation of the energy generating module 10. Thereby, the effect of the sway of the peripheral cage 48 on the energy generating device 12 is limited.

The multi-directional extensions 50 may support the energy generating device 12 by suspending the energy generating device 12 within boundaries generally limited by movement of the multi-directional extensions 50 in multiple directions during transportation of the energy generating module 10. This suspension of the energy generating device 12 may be achieved with one or more of any variety of multi-directional extensions 50, such as, but not limited to, a chain, a rope, a strap, a band, a net, etc. Further, the multi-directional extensions 50 may comprise a degree of elasticity sufficient to facilitate movement of the multi-directional extensions 50 in multiple directions in permitting the energy generating device 12 to track its inertial position more closely than the sway of the peripheral cage 48 during transportation of the energy generating module 10.

The modular cage 46 also may comprise one or more movement dampening mechanisms 52, as shown in FIG. 7. The movement dampening mechanisms 52 may dampen movement of one or more of the multi-directional extensions 50 during transportation of the energy generating module 10. The movement dampening mechanisms 52 may be, for example, shock absorbers positioned to limit movement of the multi-directional extensions 50 or bands configured to partially restrain movement of the multi-directional extensions 50, or other movement dampening mechanisms. In addition, the modular cage 46 may comprise a suspension 54 affixed to the peripheral cage 48. The suspension 54 of the modular cage 46 may reduce the sway of the peripheral cage 48 during transportation of the energy generating module 10. Thereby, the suspension 54 may limit the effect of sway of the enclosure 22 on the energy generating device 12 during transportation of the energy generating module 10.

The energy generating module 10 may also comprise louvers for ventilation, a doorway, and a door for access to the internally enclosed energy generating device 12. More particularly, portions of the enclosure walls 22 not covered by fuel chambers 16/18 may comprise a plurality of closable louvers and a doorway for personnel to access the energy generating device 12. In addition to the louvers, the energy generating modules 10 may also comprise a fan cooling system to cool the energy generating device 12. The louvers and/or the cooling system may be configured to draw air in from a roof, ends, and/or sides of the enclosure 14. Such configurations may ensure that there is sufficient air flow to support and cool the energy generating device 12 and assist with exhaust. Further, such configurations may adequately cool an interior workspace area of the enclosure 14 to permit access by personnel.

Further, while the chambers 16/18 described herein are referred to as "fuel chambers," it is contemplated that the chambers may be used for purposes other than, or in addition to, containing fuel. In fact, the chambers may be used to contain any fluid, liquid or gas. In addition, the chambers may provide hollow spaces accessible from the interior and/or exterior of the enclosure 14 in which various goods and/or supplies may be stored. Also, the chambers may contain insulation for temperature regulating purposes and/or insulation or other material for sound attenuation or reduction purposes. Further, for example, it is contemplated that some chambers may contain fuel, while other chambers within the same enclosure 14 contain insulation, sound reduction panels, supplies, a ladder to facilitate access to the interior of the enclosure, and/or may be internally divided into distinct cells that contain one or more of the above, or other goods, and any combinations thereof.

It is contemplated that two or more energy generating modules 10 may be situated side-by-side or in near locations, whether on adjacent trailer chassis, on a concrete pad or other ground surface, or on a single or multiple railway cars. The provision of multiple energy generating modules 10 in a single location may enable the continuous provision of electric power when an energy generating module 10 is inoperable due to re-fueling, maintenance, or other reason, and the simultaneous provision of electric power, whether individually, in various combinations, or cumulatively by the multiple energy generating modules 10. Further, when situated on a single or multiple railway cars, the energy generating modules 10 may be situated side-by-side, stacked on top of each other, or both, to facilitate transportation of the modules 10 and to provide greater and/or more versatile electric power output with multiple energy generating modules 10.

Further, it is contemplated that not only may the energy generating modules 10 be used for industrial, construction, mining, oil and gas exploration, and commercial applications, as described herein, but the energy generating modules 10 may be used for marine applications as well. More particularly, an energy generating module 10 may be positioned on a dock, wharf, or other water-side location such that the module 10 may provide electric power to a ship, boat, or other water vessel to charge an energy storage device of the vessel or to re-fuel the vessel with a fuel contained within the fuel chamber 16/18 of the module 10. In addition, an energy generating module 10 may be placed on-board of a water vessel to provide prime or back-up electric power for the vessel and/or for fuel for vehicles also on-board of the vessel.

It should be noted that embodiments of the fuel chamber 16/18 described herein do not attempt to improve upon existing fuel containment regulations, standards, or guidelines, such as the Underwriters Laboratories Inc.'s standards (see UL 142 and 2085). Further, it is contemplated that the energy generating modules 10 and the fuel chambers 16/18 may be configured and manufactured in accordance with UL standards 142, 2085, and/or any other standards, regulations, or guidelines.

It is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is noted that terms like "generally" and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. An energy generating module comprising an enclosure, an energy generating device, a fuel chamber, and one or more fuel conveying devices, wherein:
   the fuel chamber comprises a primary containment tank and a secondary containment tank;
   the primary containment tank is enclosed by the secondary containment tank;
   the primary and secondary containment tanks are separated by one or more interstitial spaces;
   the enclosure comprises a plurality of enclosure walls that enclose the energy generating device;
   the fuel chamber is applied to an exterior surface of at least one of the enclosure walls such that at least a portion of the exterior surface of the at least one enclosure wall is covered by the fuel chamber;
   the fuel conveying devices convey fuel from the fuel chamber to the energy generating device enclosed by the enclosure walls; and
   the energy generating device generates an energy output using fuel received from the primary containment tank of the fuel chamber.

2. The energy generating module of claim 1, wherein the secondary containment tank fully encloses the primary containment tank.

3. The energy generating module of claim 1, wherein the secondary containment tank of the fuel chamber is at least partially open on a wall along which the fuel chamber is applied to the exterior surface of the enclosure wall such that the enclosure wall to which the at least partially open wall of the secondary containment tank is applied serves both as a wall of the enclosure and as a closure of the at least partially open wall of the secondary containment tank.

4. The energy generating module of claim 1, wherein the fuel chamber is built-out from the exterior surface of the enclosure wall such that the enclosure wall from which the fuel chamber is built-out serves both as a wall of the enclosure and as a wall of one of the primary containment tank and the secondary containment tank of the fuel chamber.

5. The energy generating module of claim 1, wherein the secondary containment tank of the fuel chamber comprises a substantially smooth exterior surface.

6. The energy generating module of claim 1, wherein the enclosure is an International Organization for Standardization container, a drop-over enclosure, or a railway freight car.

7. The energy generating module of claim 6, wherein:
   at least one fuel chamber is applied to the exterior surface of at least one side enclosure wall, and
   the enclosure comprises a width of about 96 inches and the fuel chambers applied to the exterior surface of the side enclosure walls cumulatively comprise a width of about 6 inches such that a width of the energy generating module is about 102 inches.

8. The energy generating module of claim 1, wherein the interstitial spaces collect fuel leaking from the primary containment tank.

9. The energy generating module of claim 8, wherein the energy generating module further comprises one or more fuel sensors positioned in the interstitial spaces to sense a presence of fuel in the interstitial spaces.

10. The energy generating module of claim 1, wherein the energy generating module further comprises one or more fuel sensors positioned in the primary containment tank to sense a level of fuel contained therein.

11. The energy generating module of claim 1, wherein the energy generating module further comprises one or more sealable ports that permit passage of fuel to and from the primary containment tank of the fuel chamber.

12. The energy generating module of claim 1, wherein the energy generating device is an energy generating device configured to generate electric power using fuel received from the primary containment tank of the fuel chamber.

13. An energy generating module comprising an enclosure, an energy generating device, a fuel chamber, one or more fuel conveying devices, one or more fuel sensors, and one or more sealable ports, wherein:
   the fuel chamber comprises a primary containment tank and a secondary containment tank;
   the primary containment tank is enclosed by the secondary containment tank;
   the primary and secondary containment tanks are separated by one or more interstitial spaces;
   the interstitial spaces collect fuel leaking from the primary containment tank into the interstitial spaces;
   the fuel sensors are positioned in the interstitial spaces and in the primary containment tank to sense a presence of fuel in the primary containment tank and a leaking of fuel from the primary containment tank into the interstitial spaces;
   the sealable ports permit passage of fuel to and from the primary containment tank of the fuel chamber;
   the enclosure comprises a plurality of enclosure walls that enclose the energy generating device;
   the fuel chamber is applied to an exterior surface of at least one of the enclosure walls such that at least a portion of the exterior surface of the at least one exterior enclosure wall is covered by the fuel chamber;
   the fuel conveying devices convey fuel from the fuel chamber to the energy generating device enclosed by the enclosure walls; and
   the energy generating device generates an energy output using fuel received from the primary containment tank of the fuel chamber.

14. The energy generating module of claim 13, wherein the secondary containment tank fully encloses the primary containment tank.

15. The energy generating module of claim 13, wherein the secondary containment tank of the fuel chamber is at least partially open on a wall along which the fuel chamber is applied to the exterior surface of the enclosure wall such that the enclosure wall to which the at least partially open wall of the secondary containment tank is applied serves both as a wall of the enclosure and as a closure of the at least partially open wall of the secondary containment tank.

16. The energy generating module of claim 13, wherein the fuel chamber is built-out from the exterior surface of the enclosure wall such that the enclosure wall from which the fuel chamber is built-out serves both as a wall of the enclosure and as a wall of one of the primary containment tank and the secondary containment tank of the fuel chamber.

17. An energy generating module comprising an enclosure, an energy generating device, and one or more fuel conveying devices, wherein:
   the enclosure comprises a plurality of enclosure walls that enclose the energy generating device;
   the fuel chamber is applied to an exterior surface of at least one of the enclosure walls such that at least a portion of the exterior surface of the at least one exterior enclosure wall is covered by the fuel chamber;
   the fuel conveying devices convey fuel from the fuel chamber to the energy generating device enclosed by the enclosure walls; and
   the energy generating device generates an energy output using fuel received from the fuel chamber.

18. The energy generating module of claim 17, wherein the fuel chamber is at least partially open on a wall along which the fuel chamber is applied to the exterior surface of the enclosure wall such that the enclosure wall to which the at least partially open wall of the fuel chamber is applied serves both as a wall of the enclosure and as a closure of the at least partially open wall of the fuel chamber.

19. The energy generating module of claim 17, wherein the fuel chamber is built-out from the exterior surface of the enclosure wall such that the enclosure wall from which the fuel chamber is built-out serves both as a wall of the enclosure and as a wall of the fuel chamber.

\* \* \* \* \*